United States Patent [19]

Davis

[11] 4,335,684
[45] Jun. 22, 1982

[54] MICRONIZED COAL-WATER FUEL SLURRY FOR RECIPROCATING INTERNAL-COMBUSTION ENGINES

[75] Inventor: Jerry P. Davis, Concord, Mass.

[73] Assignee: Thermo Electron Corporation, Waltham, Mass.

[21] Appl. No.: 189,861

[22] Filed: Sep. 22, 1980

Related U.S. Application Data

[62] Division of Ser. No. 30,573, Apr. 16, 1979, abandoned.

[51] Int. Cl.³ .................. F02B 51/00; F02B 45/10
[52] U.S. Cl. .................................. 123/1 A; 123/23
[58] Field of Search ............. 123/1 A, 3, 25 R, 25 E, 123/23; 60/311, 280

[56] References Cited

U.S. PATENT DOCUMENTS

| | | | |
|---|---|---|---|
| 1,837,620 | 12/1931 | Karl | 123/23 |
| 1,897,819 | 2/1933 | Pawlikowski | 123/23 |
| 3,124,086 | 3/1964 | Sage et al. | 110/7 |
| 3,168,350 | 2/1965 | Phinney et al. | 44/51 |
| 3,210,168 | 10/1965 | Morway | 44/51 |
| 3,589,314 | 6/1971 | Tratz et al. | 110/28 |
| 3,682,114 | 8/1972 | Scheubel | 110/75 |
| 3,762,887 | 10/1973 | Clancey et al. | 44/51 |
| 3,908,367 | 9/1975 | Bauman | 60/280 |
| 3,996,026 | 12/1976 | Cole | 44/51 |
| 4,006,591 | 2/1977 | Cervenka | 60/39.35 |
| 4,069,022 | 1/1978 | Metzer | 44/51 |
| 4,086,883 | 5/1978 | Steiger | 123/23 |
| 4,088,453 | 5/1978 | Wiese et al. | 44/51 |
| 4,104,035 | 8/1978 | Cole et al. | 44/51 |

FOREIGN PATENT DOCUMENTS

| | | | |
|---|---|---|---|
| 822032 | 11/1951 | Fed. Rep. of Germany . | |
| 522070 | 6/1940 | United Kingdom | 123/23 |
| 1514888 | 6/1978 | United Kingdom . | |

OTHER PUBLICATIONS

"Performance of Coal-Slurry Fuels in a Diesel Engine", Tataiah, K. & Wood, C. D., AR-1254, Southwest Research Institute, pp. 1–29.

Primary Examiner—William A. Cuchlinski, Jr.
Attorney, Agent, or Firm—Herbert E. Messenger; James L. Neal

[57] ABSTRACT

A fuel slurry and engine systems for using the slurry are disclosed. The fuel slurry is a uniform mixture of water and 20 to 50 percent by weight of particulate coal of maximum size equal to 20 microns, the small size promoting complete combustion of the coal and minimizing engine wear due to particles of ash. Engine systems for utilizing the slurry of micronized coal and water are described, the preferred system including a slow-speed, two-stroke turbo-charged diesel engine. Preferred compositions of the fuel slurry are discussed and their behavior in engine systems is analyzed. Also disclosed are techniques for enhancing its ignition.

6 Claims, 1 Drawing Figure

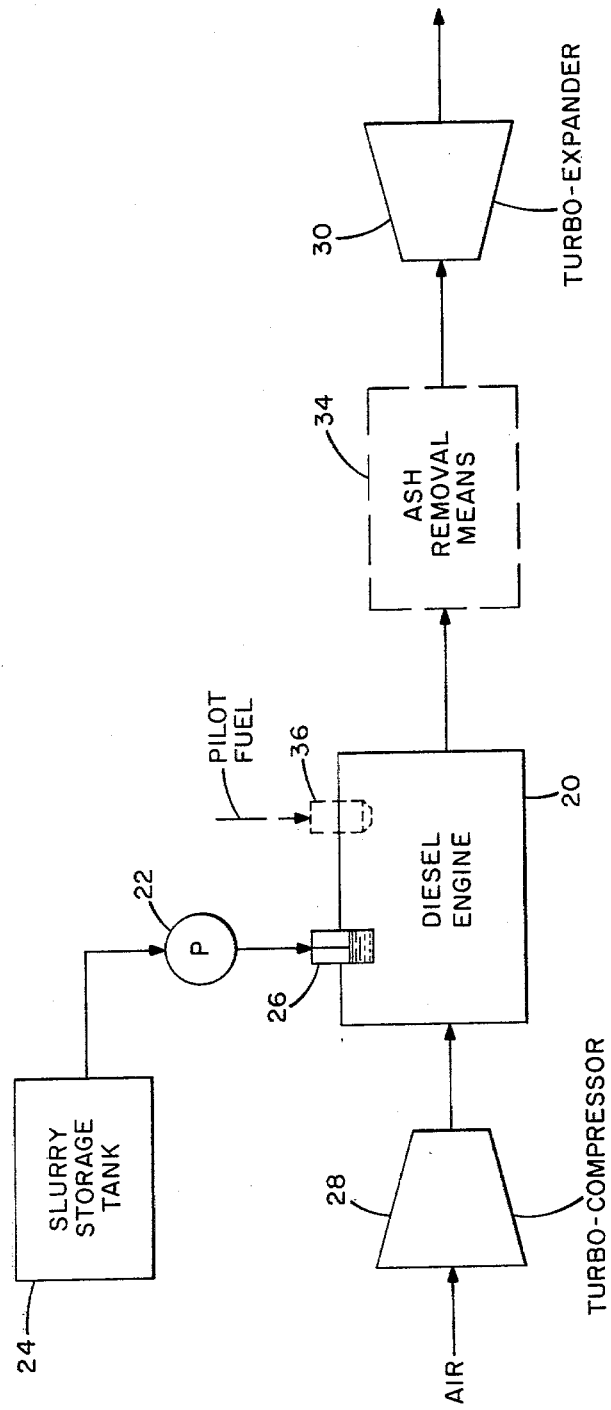

MICRONIZED COAL-WATER FUEL SLURRY FOR RECIPROCATING INTERNAL-COMBUSTION ENGINES

This is a division of application Ser. No. 30,573, filed Apr. 16, 1979, now abandoned.

BACKGROUND OF THE INVENTION

This invention relates to a coal-water fuel slurry and engine systems for utilizing the fuel slurry. In particular, the invention concerns systems with reciprocating internal-combustion engines such as slow-speed diesel engines and their operation with fuel slurries consisting of water and very fine particulate coal.

The rapidly increasing price of oil and uncertainty as to its availability has led to increased interest in the use of alternative fuels such as coal. One area of investigation has concerned fuels for internal-combustion engines such as diesel engines wherein coal is substituted for all or a portion of the liquid petroleum fuel conventionally employed. For example, fuel mixtures of pulverized coal and air have been proposed for diesel engines. Tests of such coal-air mixtures in modern diesel engines have generally been unsuccessful, however, due to incomplete combustion and difficulties in introducing the fuel into the engines. Coal-oil slurries have also been investigated as diesel engine fuels. However, in order to maintain fluid viscosities suitable for injecting the coal-oil slurry into the engine, the coal content is limited to a maximum of about 30–40 percent by weight. Thus, while a reduction in oil consumption could be achieved through use of coal-oil slurries, a large fraction of this fuel remains oil.

Accordingly, it is an object of the invention to provide a coal-water fuel slurry suitable for a reciprocating internal-combustion engine.

It is an object of the invention to provide a method for operating an internal-combustion engine fueled by a coal-water slurry so that the water acts as a carrier for the coal and also contributes to the work output of the engine.

It is also an object of the invention to provide a diesel engine system for combustion of a coal-water fuel slurry.

It is a further object of the invention to provide a method for operating a slow-speed diesel engine using a fuel slurry of micronized coal and water.

SUMMARY OF THE INVENTION

The invention concerns a coal-water fuel slurry and reciprocating internal-combustion engine systems for using the slurry. A preferred fuel slurry consists essentially of 20 to 50 percent by weight of particulate carbonaceous material, preferably coal, with the balance of the slurry being water. The coal in the slurry is in the form of micronized particles having a size not in excess of 20 microns, the small particle size facilitating complete combustion of the coal, minimizing particle size of any ash formed during combustion, and minimizing wear of engine parts in which the fuel slurry is used. The water in the fuel slurry serves as a transport medium for the micronized coal. Also, upon introduction of the fuel slurry into a reciprocating internal-combustion engine, the water vaporizes to form steam which contributes to work output of the engine during expansion.

In one embodiment of the invention an engine system and method for operating the system are provided. A fuel slurry containing 20 to 50 percent by weight of micronized coal of particle sizes not in excess of 20 microns is injected into a slow-speed diesel engine, mixed with and burned with air, and then work is extracted during expansion of the resulting steam and products of combustion.

A preferred fuel slurry for use in a power-generating diesel engine system contains 30 to 40 percent by weight of micronized coal having particle sizes not in excess of 10 microns. To aid in ignition of the fuel slurry, up to 10 percent by weight of a combustible fluid may be substituted for water in the slurry, or an ignition pilot supplied with a small amount of combustible fluid such as petroleum fuel may be provided as part of the diesel engine. Small amounts of viscosity enhancers and suspension stabilizers may also be included in the fuel slurry.

BRIEF DESCRIPTION OF THE DRAWING

The FIGURE is a block diagram of a power-generating diesel engine system for using a coal-water fuel slurry according to the invention.

DETAILED DESCRIPTION OF PREFERRED EMBODIMENTS

The fuel slurry of the present invention is a mixture of water and a solid carbonaceous material, preferably coal. For reasons to be set forth hereinafter, the coal comprises 20 to 50 percent by weight of the slurry and is in the form of particles whose maximum size is 20 microns.

The characteristics of the novel fuel slurry which readily permit its substitution for liquid petroleum fuels are closely related to the engine systems in which the slurry is used and the methods of operating these systems. The coal-water fuel slurry of the invention is uniquely formulated for use in reciprocating internal-combustion engines. It is particularly useful in slow-speed, two-stroke diesel engines such as those manufactured by Sulzer Brothers Ltd. of Switzerland and presently used in applications such as electric power generation and marine propulsion. The very low speeds (80 to 150 RPM) of such diesel engines provide adequate time for complete combustion of coal particles. Moreover, the high wear tolerance of their cooled metal parts give the potential for long operating life.

An important parameter of the fuel slurry is the particle size of the coal which is mixed with water to form the slurry. Even though the low speeds of the preferred diesel engines are helpful in promoting combustion of coal in the fuel slurry, coal particle sizes not in excess of 20 microns provide the surface area necessary to promote complete combustion in the engine and thus are a critical aspect of the fuel slurry of the invention. An additional benefit of the very small coal particle sizes employed in the fuel slurry is that any ash present in the slurry or formed during combustion will also consist mainly of very small particles, thus reducing erosion and wear of engine parts such as cylinder liners and piston rings. Further, the micronized coal, which in the embodiments currently preferred over all others comprises particles having a size not in excess of 10 microns, minimizes the agitation required to maintain a uniform composition of the coal-water slurries during their storage.

The above described micronized coal comprises 20 to 50 percent by weight of the slurry, with the balance of the slurry being water. At coal contents above about 50 percent by weight, a slurry of coal and water would be too viscous for pumping and injection into diesel and other internal-combustion engines. Coal contents below about 20 percent by weight would result in a slurry with unacceptable ignition characteristics and whose combustion would yield unacceptably low overall cycle efficiencies. As discussed hereinafter, a preferred coal-water slurry with coal content of 40 percent by weight, when burned in a diesel engine, produces combustion products and overall thermal efficiencies nearly equivalent to those resulting from the burning of typical liquid petroleum fuels.

In the preparation of the mixture of water and micronized coal to form the fuel slurry, as-received coal must be mechanically reduced to the specified size (e.g., not in excess of 20 microns) since micronized coal is not readily available commercially. In one method of preparing the fuel slurry, sufficient water to form the desired coal-water fuel slurry is first added to the as-received pulverized coal. The resulting coal-water mixture is then fed to an attrition mill, a device for agitating and grinding coal in which part of the reduction in coal particle size is produced by the rubbing together of coal particles and suitably sized metal balls.

The FIGURE shows one system for generating power using the fuel slurry for the invention. This engine system includes a diesel engine 20 to which the coal-water fuel slurry is supplied by means such as a pump 22. The pump is connected between a slurry storage tank 24 and means for introducing the fuel slurry into the engine 20 such as a fuel injector 26. The engine 20 is preferably a slow-speed, two-stroke diesel engine having an operating speed of 80 to 150 revolutions per minute. An example of a diesel engine for use in the system illustrated in the FIGURE is a Model 12 RND105M manufactured by Sulzer Brothers Ltd. of Switzerland. This engine is a two-stroke, valveless engine having a speed of 108 RPM and a rated output of about 40 megawatts.

In the system shown, a turbo-compressor 28 is in fluid communication with an inlet of the diesel engine 20 for supplying compressed air to the diesel engine 20 for combustion with the fuel slurry. A turbo-expander 30 is also provided to extract power from the exhaust gases of the diesel engine 20. Ash removal means 34 such as a cyclone separator or a precipitator may be provided to remove coal ash from the exhaust of the diesel engine 20 to prevent excessive corrosion and erosion of the blading in the turbo-expander. The total power produced by the system is that generated by the diesel engine 20 plus the net power produced by the combination of the turbo-expander 30 and the turbo-compressor 28.

Under certain conditions, such as when fuel slurry compositions having low coal contents are used, it may be desirable to modify the engine system or fuel slurry composition to aid in ignition of the mixture of compressed air and coal-water slurry. One method of enhancing the ignition characteristics of the fuel slurry is to substitute up to 10 percent of a combustible fluid such as methanol or ethanol for an equivalent amount by weight of water in the slurry. Alternatively a pilot injector 36 may be added to the diesel engine 20 as shown in dashed form in the FIGURE for injecting into the diesel engine 20 a combustible fluid in an amount up to 10 percent by weight of the fuel slurry supplied thereto.

To help maintain a uniform suspension of coal particles in the fuel slurry, small amounts (up to about 2 percent by weight) of suspension stabilizers may be substituted for water in the slurry. Similar amounts of viscosity enhancers may also be included to regulate viscosity of the slurry.

Operation and performance of the above-described system employing a selected coal-water slurry may be understood from a description of the thermodynamic processes which occur, with particular emphasis on those in the diesel engine 20. One fuel slurry for the engine 20 consists of 40 percent by weight of coal (idealized as pure carbon) and 60 percent by weight of water i.e., equal mole fractions of carbon and water. The basic combustion reaction of this fuel slurry when introduced into and mixed with compressed air in the diesel engine 20 is as follows:

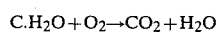
$$C \cdot H_2O + O_2 \rightarrow CO_2 + H_2O$$

By way of comparison, a typical liquid petroleum fuel combustion reaction is:

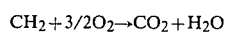
$$CH_2 + 3/2 O_2 \rightarrow CO_2 + H_2O$$

It is apparent from these reactions that the products of combustion of a 40 weight percent coal (carbon), 60 weight percent water slurry are similar to those of a liquid petroleum fuel. In particular, as many moles of water are produced during combustion of a liquid petroleum fuel as are present in the combustion of this embodiment of the fuel slurry.

The thermodynamic efficiency of combustion of this coal-water fuel slurry and of others containing less coal and more water is highly dependent on the net effect of the liquid water in the slurry. One effect of introducing water into the diesel engine 20 or other suitable reciprocating internal-combustion engine is to reduce the quantity of excess air required for combustion at a given maximum peak cycle temperature. Here, excess air refers to the additional air required above that which would be utilized in stoichiometric combustion. The reduction in excess air provided when the coal-water slurry is utilized tends to increase efficiency since it reduces the amount of compression required per unit of fuel combusted. A second effect is that thermal energy is required during combustion to vaporize the liquid water to a gaseous state, which has a negative effect on thermodynamic efficiency. In a third effect, the water which vaporizes becomes a pressurized gas from which work is extracted during the expansion stroke of each piston of the diesel engine 20, which has a positive effect on efficiency. The net result of these three effects greatly influences the thermodynamic efficiency of an engine system utilizing the coal-water fuel slurry and determines whether this efficiency is higher or lower than that which could be obtained using liquid petroleum fuels.

It should also be pointed out that, in addition to influencing cycle efficiency, the presence of water in the fuel slurry may substantially reduce the amount of $NO_x$ produced in an engine system utilizing the coal-water fuel slurry by minimizing local high temperature combustion zones.

The overall effect on efficiency can be determined from the following analysis of combustion of a fuel slurry consisting of 40 percent by weight of an idealized coal (containing carbon only) and 60 percent by weight of water. The cycle analyzed includes an adiabatic compression of inlet air to a pressure ratio of 20 to 1. This is followed by constant pressure heat addition by combustion to a maximum cycle temperature of 2000° F., and then an adiabatic expansion of the resulting combustion products back to inlet pressure. Compression and expansion efficiencies of 88 percent are assumed, and overall cycle efficiency is determined from the definition:

$$\frac{\text{cycle efficiency}}{100} = \frac{\text{work of expansion} - \text{work of compression}}{\text{heat input}}$$

Cycle efficiencies were calculated for the selected fuel slurry and for a liquid petroleum fuel ($CH_2$). Values of efficiency were determined using heat inputs determined from lower heating value (LHV) of the fuels, and also using heat inputs determined from higher heating value (HHV) of the fuels. (Lower heating value, the better measure of actual engine performance, is based on the assumption that heat from condensation of water in the exhaust gases of the engine is not available for performing work in a practical engine. Higher heating value includes this heat from condensation of water in the exhaust gases and is a better indicator of economic merit of a fuel since fuels are purchased on the basis of higher heating value). The work of compression and work of expansion for these calculations were determined from the above-described cycle parameters and adiabatic processes. The resulting cycle efficiencies are given in Table 1.

TABLE 1

| Fuel | LHV (BTU/lb) | HHV (BTU/lb) | Cycle Efficiency (percent) (LHV) | (HHV) |
|---|---|---|---|---|
| Liquid petroleum ($CH_2$) | 18691 | 20040 | 36.8 | 34.3 |
| Fuel slurry (C . $H_2O$) (40% coal, 60% water) | 5167 | 5798 | 38.5 | 34.3 |

For a coal-water fuel slurry consisting of 40 percent by weight C and 60 percent by weight $H_2O$, cycle efficiencies produced by combustion in a reciprocating internal combustion engine are quite similar to those of conventional petroleum fuels.

A second analysis was made using the cycle parameters and processes described above for a typical as-received coal having the following composition:

TABLE 2

| Component | Percent by Weight |
|---|---|
| Moisture | 9.61 |
| Corrected Ash | 9.19 |
| Carbon* | 66.60 |
| Net hydrogen* | 3.25 |
| Sulfur | 0.49 |
| Nitrogen | 1.42 |
| Combined water | 9.44 |

*Net hydrogen-to-carbon mole ratio = $\frac{3.25/1}{66.6/12} \approx 0.6$

Thus the basic coal "molecule" is taken as equivalent to $CH_6$. In this example, combustion of a fuel slurry consisting of 30 percent by weight of the as-received coal of Table 2 and 70 percent by weight of water was analyzed. The calculated cycle efficiency for the fuel slurry was 30.2 percent (based on HHV), only a few percent below the value of 34.3 percent (Table 1) for a typical petroleum fuel.

Further insight into the advantages of using the coal-water fuel slurry and into the operation of a turbocharged diesel engine system utilizing the slurry is provided by the following example. In this example the performance of a diesel engine system such as that shown in the FIGURE and using a fuel slurry composed of water and 30 percent by weight of coal having the composition listed in Table 2 is analyzed and compared with the performance yielded by a typical petroleum fuel. A peak cycle temperature of 2500° F. and a pressure ratio of 60 to 1 were specified as cycle parameters representative of a typical modern turbocharged diesel engine. Also, the amounts of fuel and air provided as inputs were selected to yield the same power output for an expansion stroke using the coal-water slurry and for an expansion stroke using the petroleum fuel. Thus, peak cycle temperature and pressure are essentially the same for both fuels. This selection of fuel and air inputs facilitates comparison of the maximum net work obtainable when the different fuels are burned in a particular engine since expansion stroke power output is the primary limitation on maximum output from a diesel engine of a given size. Results of the analysis (Table 3) show that only a modest efficiency penalty is incurred in using the selected coal-water slurry in place of a petroleum fuel in a diesel engine system.

TABLE 3

| Item | Petroleum Fuel | Coal-Water Slurry (30% coal, 70% water) |
|---|---|---|
| Combustible fuel input (moles) | 1.0 | 2.137* |
| Air input (moles) | 23.49 | 17.92 |
| Water input (moles) | 0 | 5.42** |
| Total exhaust gases (moles) | 23.99 | 23.65 |
| Expansion work (BTU) | 320,934 | 320,934 |
| Compression work (BTU) | 213,092 | 162,589 |
| Net Work (BTU) | 107,842 | 158,345 |
| Fuel HHV (BTU/lb of combustible fuel) | 19,710 ($CH_2$) | 16,629 ($CH_6$) |
| Heat Input - HHV (BTU) | 276,531 | 448,063 |
| Efficiency - HHV (percent) | 39.00 | 35.34 |

*equivalent moles of $CH_6$
**including water in as-received coal

Also to be noted from Table 3 is that for equivalent amounts of expansion work, which is the real limitation of a diesel engine of a given size and mechanical requirements, the net work produced by the diesel engine system operating on the coal-water slurry of the present invention is about 47 percent higher than that produced using the petroleum fuel. This strongly suggests that the capital cost of a diesel engine system operating on the coal-water slurry (and excluding costs of preparing the slurry from as-received coal) is considerably lower per kilowatt of power output than systems using conventional petroleum fuels. The reason for the higher net work is the reduced quantity of air and the reduced amount of compression work required to obtain a given amount of expansion work from the coal-water slurry.

During operation, the motive fluid for the expansion stroke in a diesel engine supplied with a coal-water slurry containing less than 40 percent by weight of dry coal acts as a mixture intermediate between pure steam and the products of combustion of a petroleum fuel. The excess steam in this motive fluid causes the diesel engine to assume some of the operating characteristics of a steam-reciprocating engine and thus the engine might properly be termed a "Steisel" (steam and diesel).

In contrast to a steam engine, however, the steam which forms a portion of the motive fluid of this "Steisel" engine is generated during the direct combustion of a coal-water slurry fuel in an expansion chamber of the engine rather than externally in a steam boiler, which results in lower capital costs and higher cycle efficiencies.

Thus the coal-water slurry of the invention is a useful and valuable substitute for petroleum fuels for certain specialized power-generating systems. This fuel slurry may be introduced into and burned in reciprocating internal-combustion engines such as slow-speed diesels to produce high levels of power at high efficiencies.

What is claimed is:

1. A method for generating power comprising:
   introducing into a valveless diesel engine operable at speeds from 80 to 150 revolutions per minute a liquid fuel slurry consisting of a mixture of water and 20 to 50 percent by weight of coal, in the form of particles having a maximum size not in excess of 20 microns;
   introducing into said diesel engine a combustible fluid in an amount up to 10 percent by weight of said fuel slurry supplied thereto to aid in ignition of said fuel slurry;
   mixing said fuel slurry and said combustible fluid with compressed air in said engine at conditions of pressure and temperature such that the coal in said slurry burns to form combustion products and the water in said fuel slurry vaporizes to form steam; and
   extracting work from said combustion products and said steam to generate power.

2. A method for generating power as in claim 1 wherein said work extraction step includes an expansion of said combustion products and said steam in an expansion chamber of said engine to form the exhaust of said engine.

3. A method for generating power as in claim 2 wherein said work extraction step further includes an expansion of the exhaust of said engine in a turbo-expander.

4. A system for generating power comprising:
   a valveless diesel engine operable at speeds from 80 to 150 revolutions per minute for burning micronized coal in a mixture of micronized coal, water, and compressed air supplied to said engine and for extracting work from the fluid resulting from said burning;
   means for supplying compressed air to said engine;
   means for supplying a liquid fuel slurry consisting of water and micronized coal to said engine;
   means for introducing into said engine a combustible fluid in an amount up to 10 percent by weight of the fuel slurry supplied thereto to aid in ignition of said fuel slurry; and
   means in fluid communication with the exhaust of said engine for extracting work from the exhaust gases of said engine.

5. A system as in claim 4 wherein said means for extracting work from the exhaust gases of said engine comprises a gas turbine.

6. A system as in claim 5 further including ash removal means connected between said engine and said gas turbine for removing coal ash from the exhaust of said engine.

* * * * *